(12) United States Patent
Park

(10) Patent No.: US 12,019,307 B2
(45) Date of Patent: Jun. 25, 2024

(54) EYEWEAR WITH ADJUSTABLE TEMPLES ANGLE AND DETACHABLE THE TEMPLE

(71) Applicant: KOREA O.G.K CO., LTD., Wonju-si (KR)

(72) Inventor: Soo An Park, Seongnam-si (KR)

(73) Assignee: KOREA O.G.K CO., LTD., Wonju-si (KR)

( * ) Notice: Subject to any disclaimer, the term of this patent is extended or adjusted under 35 U.S.C. 154(b) by 0 days.

(21) Appl. No.: 18/530,933

(22) Filed: Dec. 6, 2023

(65) Prior Publication Data

US 2024/0111176 A1 Apr. 4, 2024

Related U.S. Application Data

(63) Continuation of application No. PCT/KR2023/003232, filed on Mar. 9, 2023.

(30) Foreign Application Priority Data

Sep. 22, 2022 (KR) .......................... 10-2022-0119958

(51) Int. Cl.
  *G02C 1/00* (2006.01)
  *G02C 5/00* (2006.01)
(52) U.S. Cl.
  CPC ............... *G02C 1/10* (2013.01); *G02C 5/006* (2013.01)
(58) Field of Classification Search
  CPC .................................. G02C 1/10; G02C 5/006

USPC .......................................................... 351/41
See application file for complete search history.

(56) References Cited

U.S. PATENT DOCUMENTS 9,261,711 B1 * 2/2016 Chen .................. G02C 1/04
9,740,021 B1 * 8/2017 Chen .................. G02C 1/04

FOREIGN PATENT DOCUMENTS

| JP | 2013-213891 A | 10/2013 |
| KR | 20-0347241 Y1 | 4/2004 |
| KR | 10-2009-0046709 A | 5/2009 |
| KR | 20-0472592 Y1 | 5/2014 |
| WO | 1995/012139 A1 | 5/1995 |

OTHER PUBLICATIONS

Korea Intellectual Property Office, "Request for the Submission of an Opinion" issued in KR 10-2022-0119958, Nov. 16, 2022, pp. 1-7.
Korea Intellectual Property Office, "Written Decision on Registration" issued in KR 10-2022-0119958, issued Feb. 6, 2023, pp. 1-5.

* cited by examiner

*Primary Examiner* — Tuyen Tra
(74) *Attorney, Agent, or Firm* — Dinsmore & Shohl LLP

(57) ABSTRACT

Disclosed is eyewear including: a lens unit comprising a lens; a detachable frame detachably coupled to the lens unit at both left and right ends of the lens unit with respect to a user; a temple arm coupled to one end of the detachable frame and fitting over the user's ears; and a connecting member disposed between the detachable frame and the eyeglass temple to connect the detachable frame and the eyeglass temple.

14 Claims, 13 Drawing Sheets

[FIGURE 1]
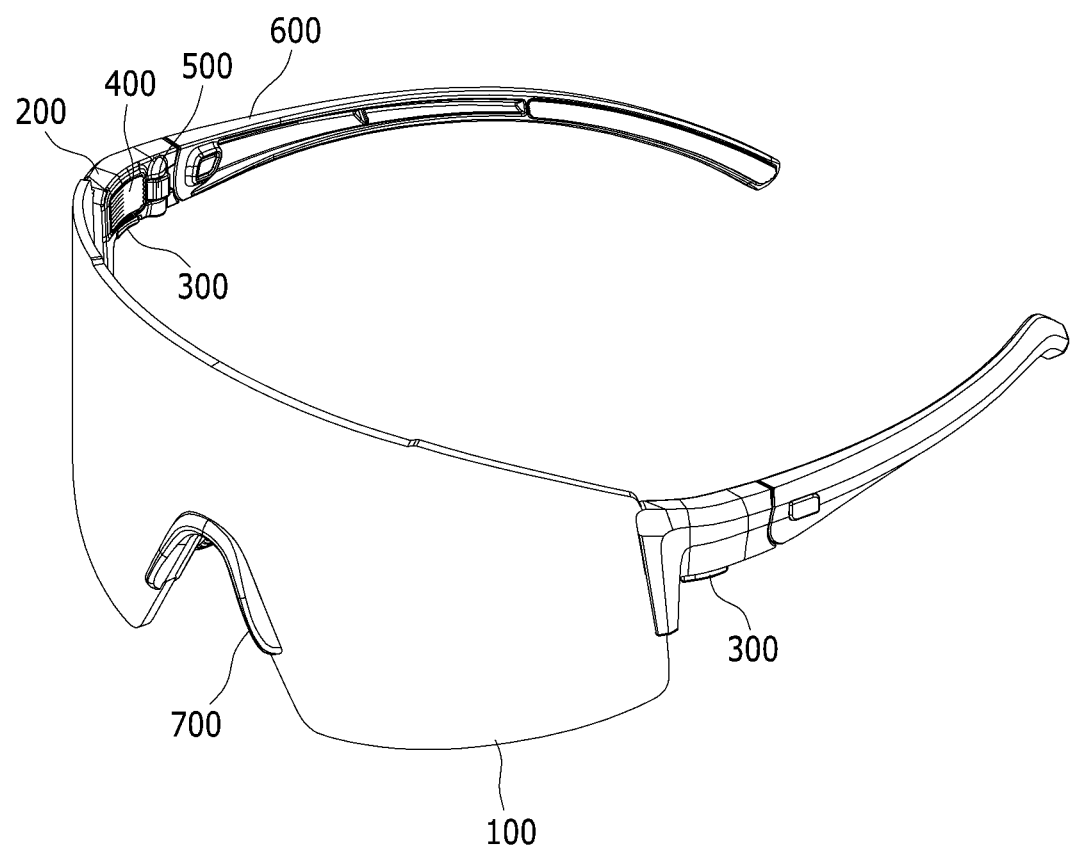

[FIGURE 2]
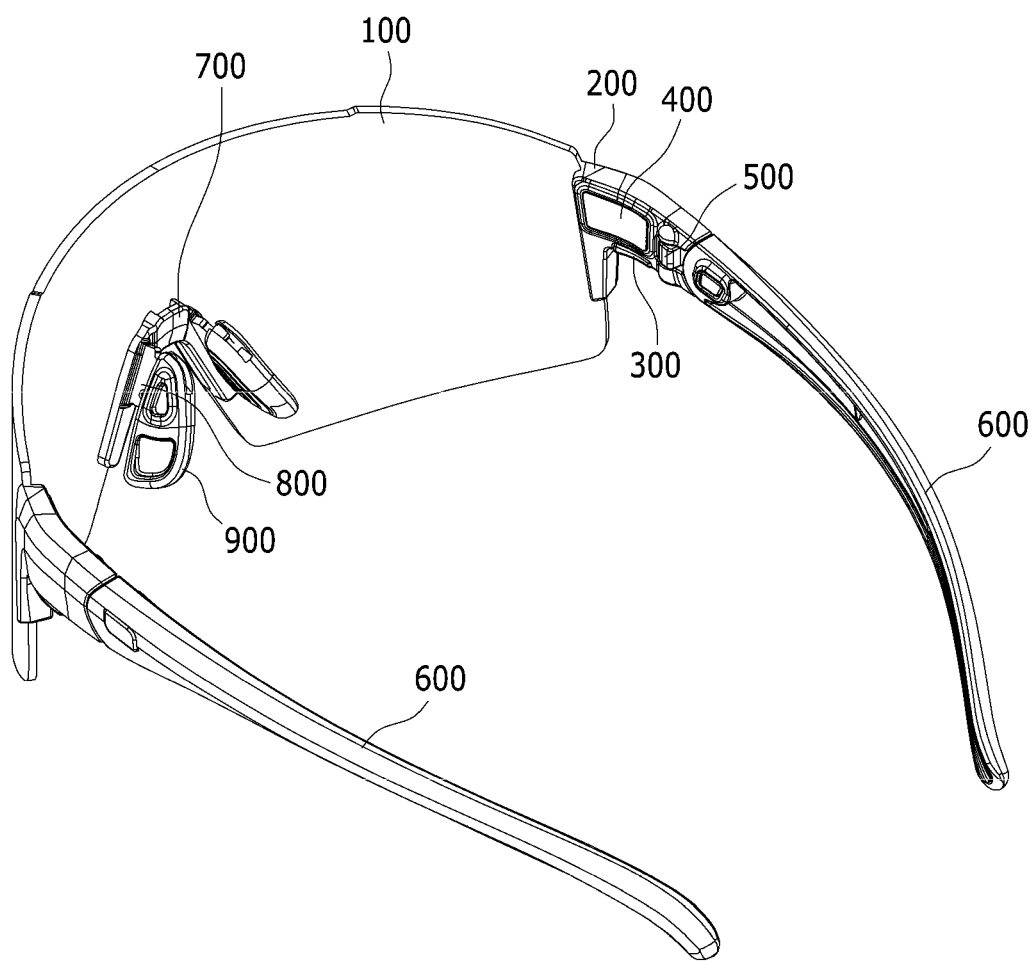

【FIGURE 3】
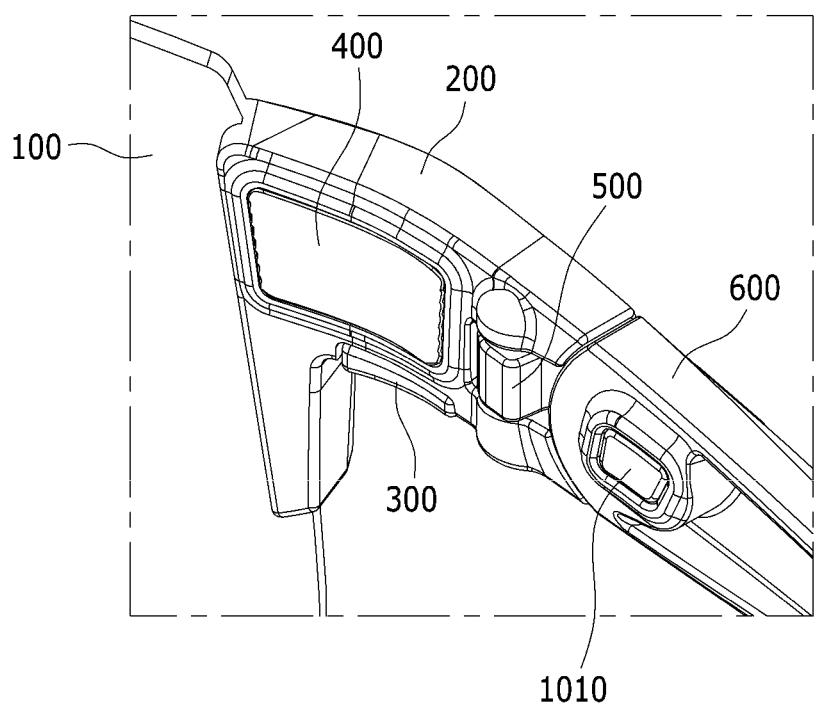
【FIGURE 4】
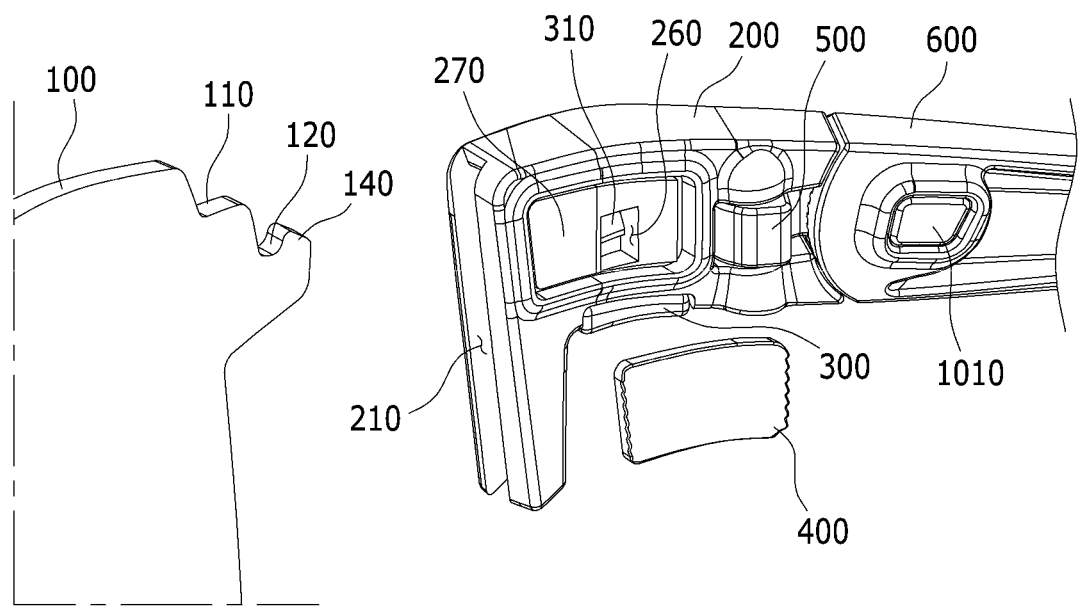

【FIGURE 5】
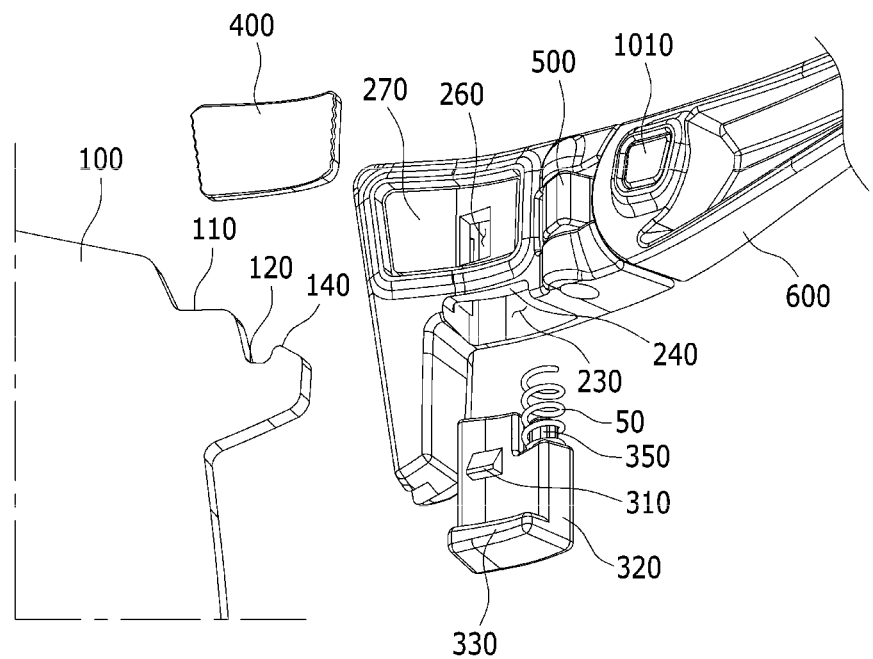
【FIGURE 6】
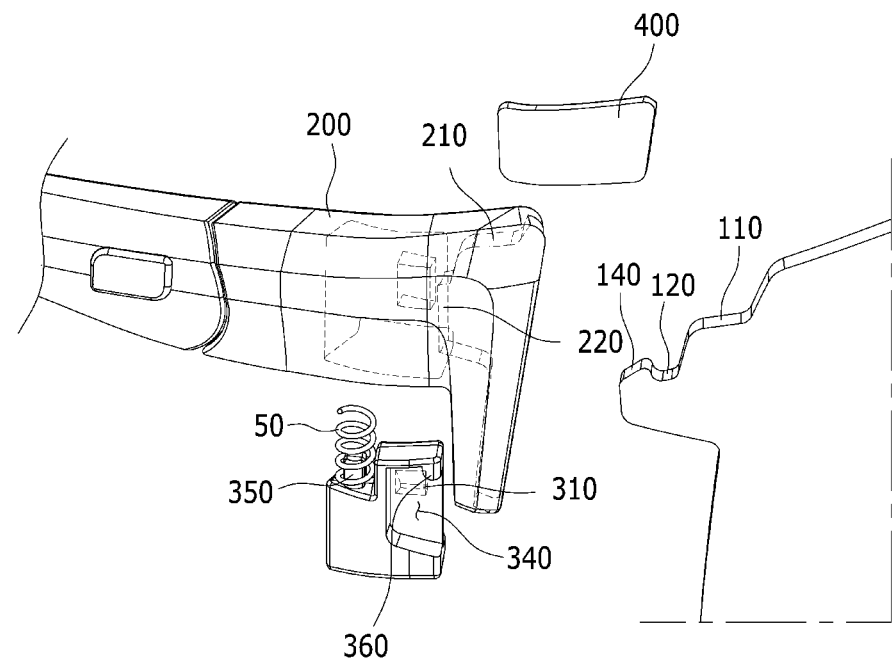

【FIGURE 7】
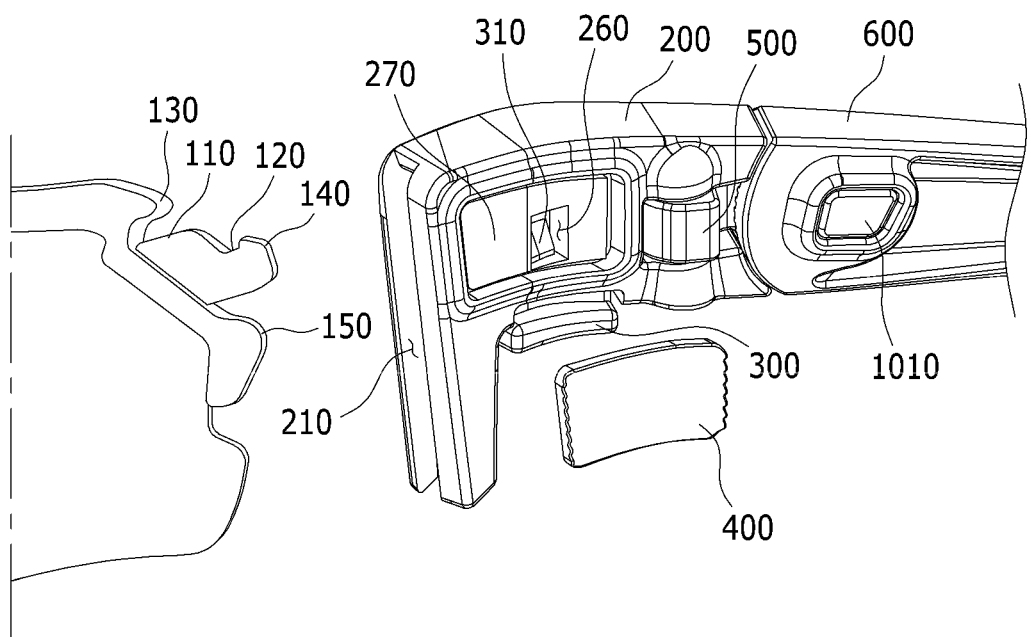

[FIGURE 8]
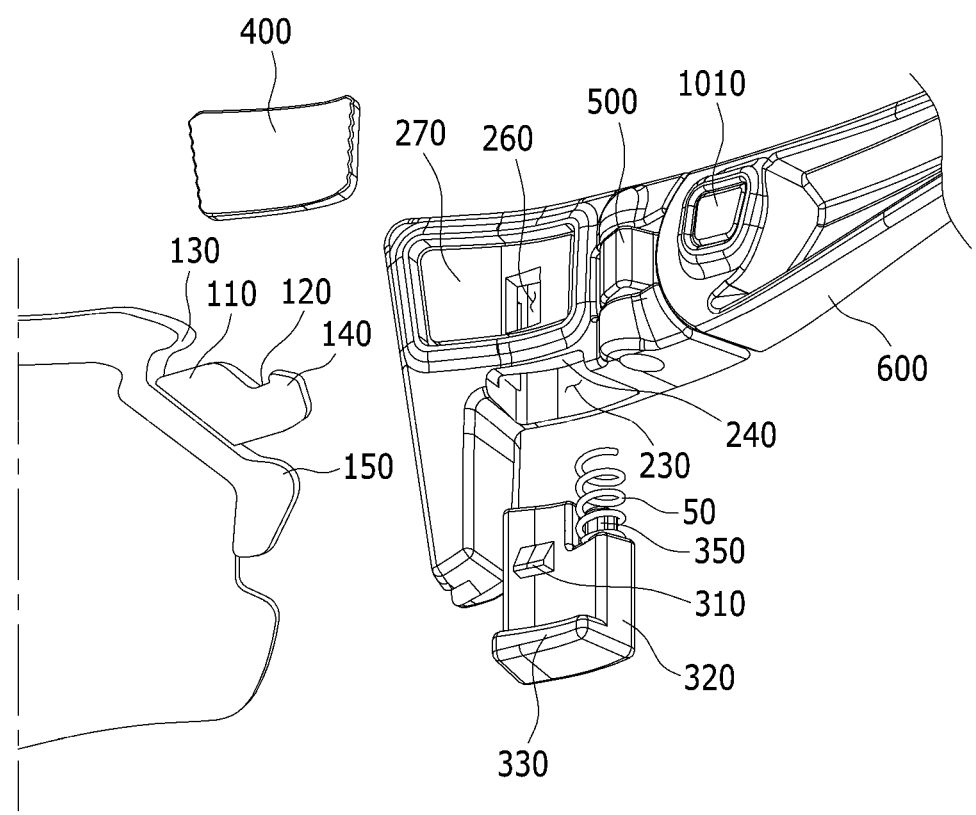

[FIGURE 9]
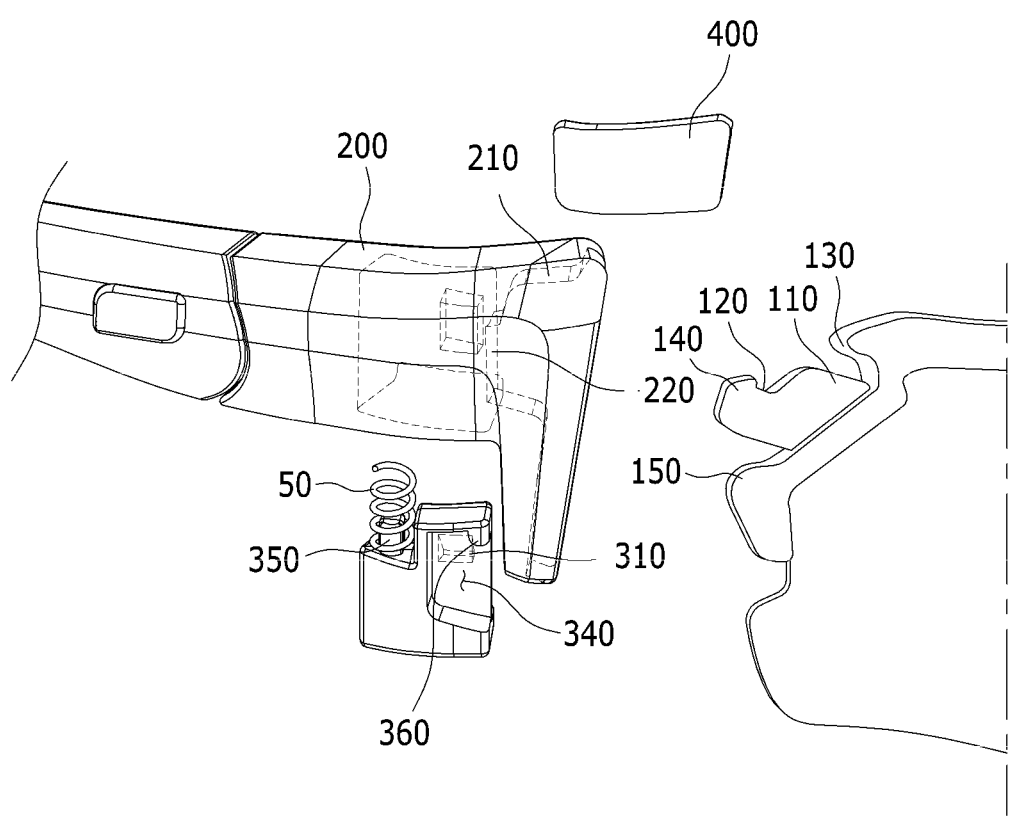

[FIGURE 10]
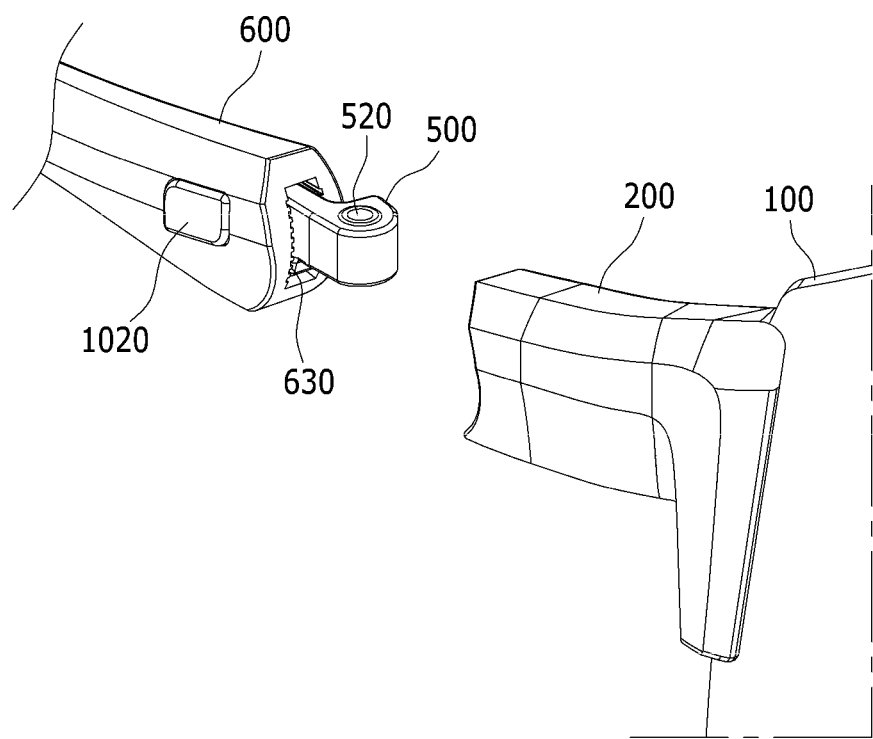

[FIGURE 11]
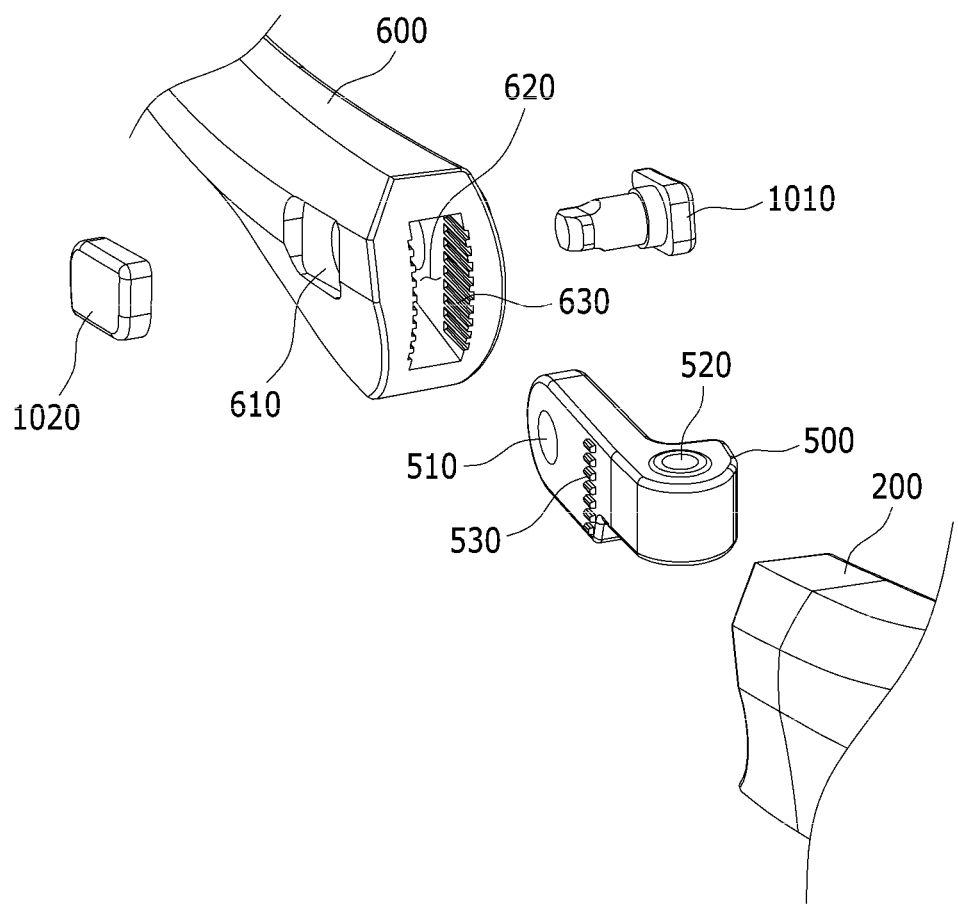

【FIGURE 12】
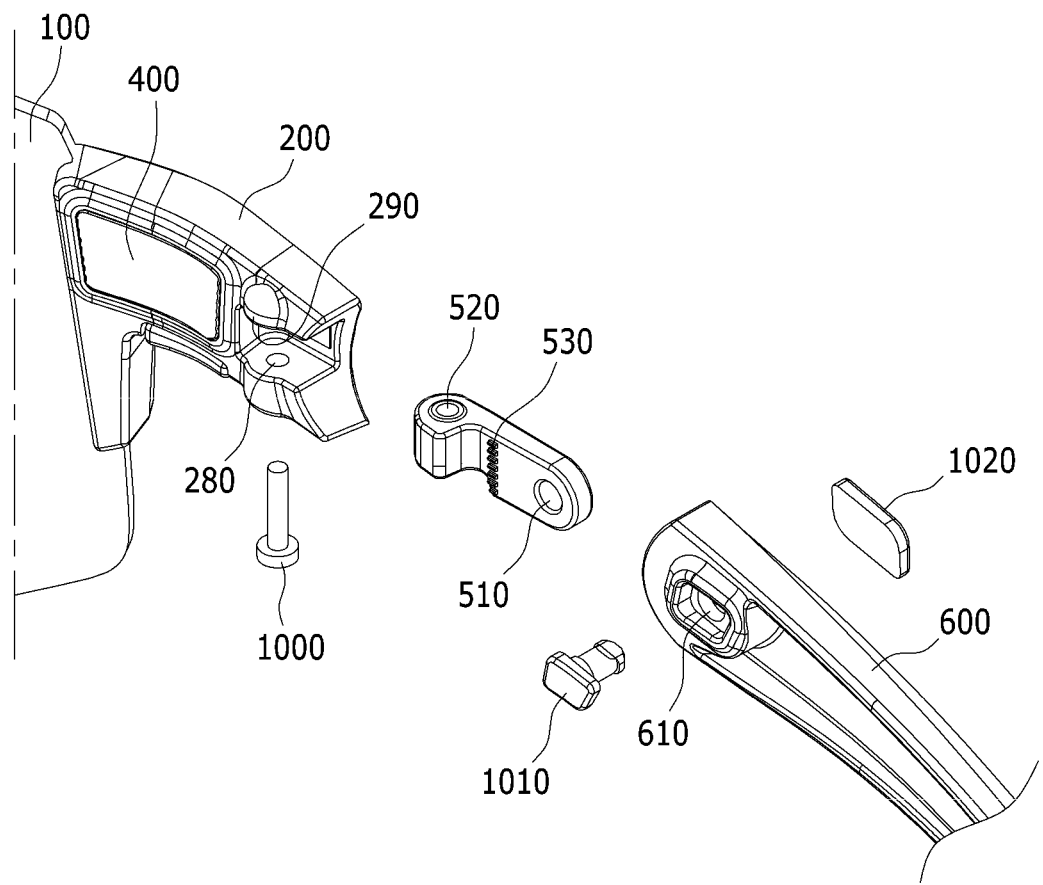

[FIGURE 13]
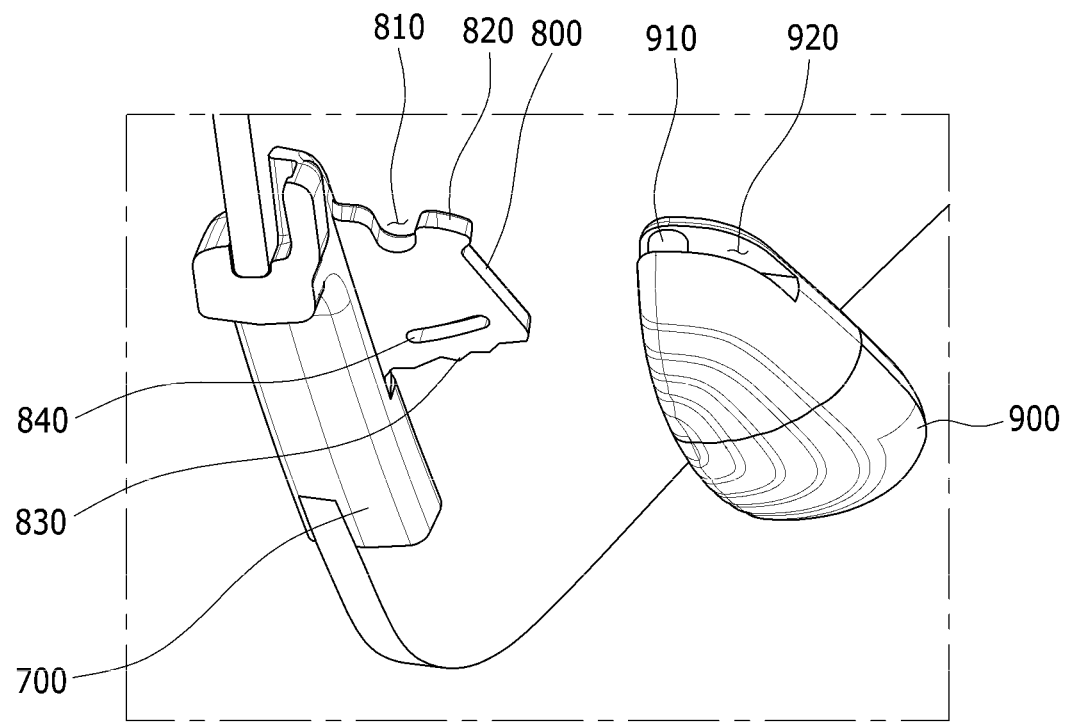

[FIGURE 14]
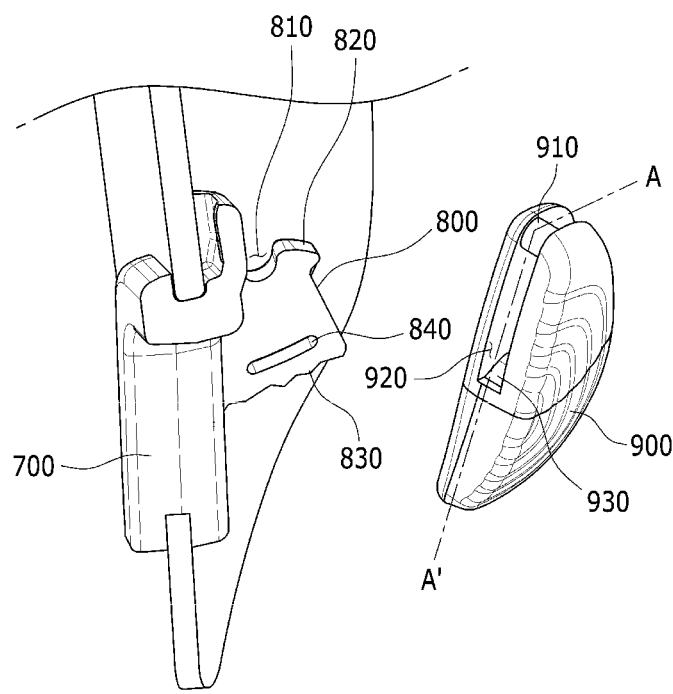
[FIGURE 15]
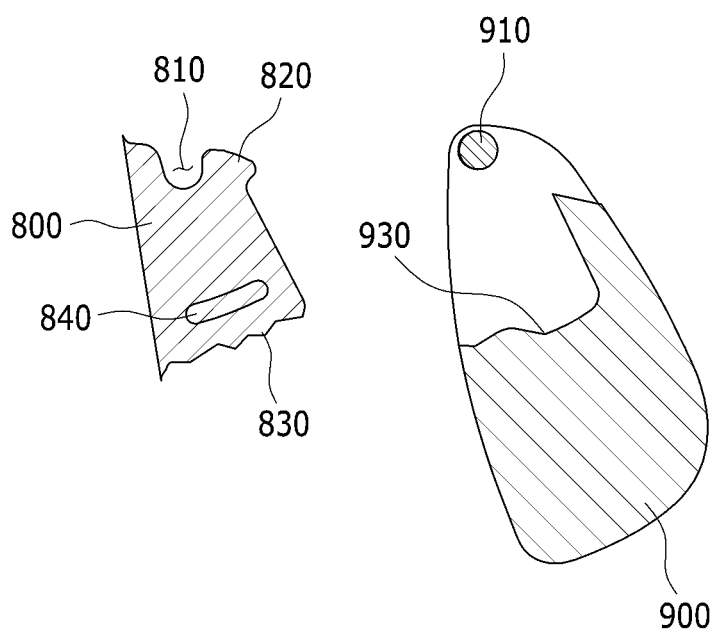

[FIGURE 16]
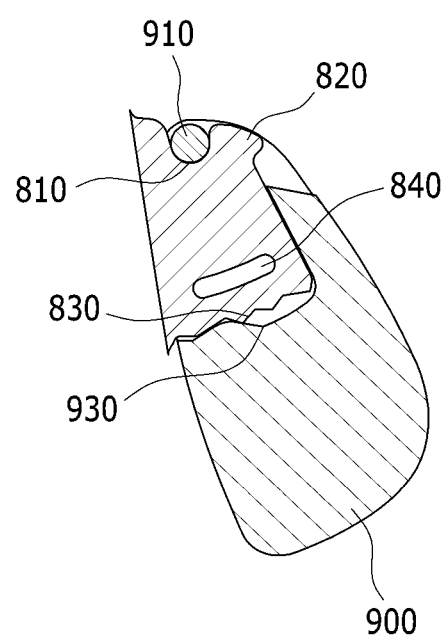

EYEWEAR WITH ADJUSTABLE TEMPLES ANGLE AND DETACHABLE THE TEMPLE

CROSS REFERENCE TO RELATED APPLICATIONS

This application is a continuation of International Patent Application No. PCT/KR2023/003232, filed Mar. 9, 2023, which claims priority to KR10-2022-0119958, filed Sep. 22, 2022, the entire contents of each of which are incorporated herein by reference in their entirety.

TECHNICAL FIELD

The present disclosure relates to eyewear with temple arms adjustable in angle and detachable.

BACKGROUND ART

Eyewear includes general eyeglasses formed of a transparent material with adjustable refractive indices, and products such as sunglasses and goggles that reduce light transmission to prevent glare and protect a user's eyes from ultraviolet rays. Commonly used sunglasses and the like are manufactured by adding colorants to transparent eyeglass materials or coating or depositing light-reflecting materials to reduce glare to users or protect their eyes from ultraviolet rays. Meanwhile, in general, eyewear consists of a lens, which is transparent or colored in a transparent part, a frame to support the lens, temple arms connected to the frame and fitting over a user's ears to secure the eyewear on the user's face, and nose pads to support the eyewear on the user's nose in order to keep the eyewear in place on the user's face.

Recently, there is a demand for eyewear that goes beyond simple eyeglasses but can perform various functions. In particular, general eyewear is mass-produced with a uniform design featuring the same position and angle, and users have adapted to fit such standardized eyewear. Therefore, new features that allow for various adjustments in the wearing position of eyewear are in demand. Furthermore, since each user's facial shape is unique, there is a demand for new features that allow each user to wear eyewear according to their own comfort and convenience.

Hence, research is required for eyewear with various features, where temple arms can be detachably coupled to a lens. This allows users to easily replace the temple arms or lens with the desired type of temple arms or lens and easily adjust angles of the temple arms and nose pads.

DISCLOSURE

Technical Problem

The present disclosure provide eyewear in which a frame holding a lens is minimized while temple arms or connectors coupled to the lens are easily attached and detached.

The present disclosure also provides eyewear that allows easy repair and reuse of a broken or damaged part that connects the lens and a temple arm.

The present disclosure also provides eyewear that allows a user to conveniently adjust the angle of a temple arm and the angle of a nose pad to their liking, enabling the user to wear the eyewear as they wish.

The present disclosure also provides eyewear that is securely fastened after the angle of a temple arm or nose pad of the eyewear is adjusted, preventing unintended further angle changes by a user.

The present disclosure also provides eyewear that prevents abrasion of the frame, where the temple arms and nose pads are connected, despite adjustments in the angle of the temple arms and nose pad, thereby ensuring excellent durability.

Technical objects of the present disclosure are not limited to the above-described objects and other technical objects that have not been described above may become evident to those skilled in the art from the following description.

Technical Solution

In one aspect of the present disclosure, there is provided eyewear including: a lens unit comprising a lens; a detachable frame detachably coupled to the lens unit at both left and right ends of the lens unit with respect to a user; a temple arm coupled to one end of the detachable frame and fitting over the user's ears; and a connecting member disposed between the detachable frame and the eyeglass temple to connect the detachable frame and the eyeglass temple.

In addition, the eyewear may further include a button unit inserted inside the detachable frame and moving up and down to engage and separate a portion of the lens unit so as to couple or separate the detachable frame and the lens unit. The detachable frame may include: a first cavity formed as an empty space at a location facing one end of the lens unit, allowing a portion of the lens unit to be inserted into a side surface of the detachable frame; and a second cavity formed as an empty space that opens from bottom to top, enabling the button unit to be inserted and move up and down. The first cavity and the second cavity may be connected to each other inside the detachable frame.

wherein the lens of the lens unit may include the following, each located at both left and right ends: a first end bent inclinedly downward with respect to a first direction, in which a top of the lens is directed, and extending again in the first direction; a second end bent inclinedly from the first end downward with respect to the first direction and extending again in the first direction; and a fixation protrusion extending from the second end and protruding toward the top. The first and second ends may be inserted into the first cavity of the detachable frame. The fixation protrusion may be inserted into the first cavity of the detachable frame and is secured by engaging with a portion of the button unit.

In addition, the first end of the lens unit may be longer than the second end, the fixation protrusion may protrude toward the top and then extends again inclinedly toward the bottom, and the lens unit may extend again inclinedly downward from a lower side of the fixation protrusion in the opposite direction to the first direction.

In addition, the detachable frame may further include a third cavity externally exposed on a same horizontal line as the first cavity, but in a direction perpendicular to the direction in which the first cavity is formed. The eyewear may further include an elastic body disposed within the second cavity of the detachable frame, between an inner wall of the detachable frame and the button unit, to allow the button unit to move up and down. The button unit may include: a body inserted into the detachable frame; an anchor heel protruding from the body toward the third cavity of the detachable frame, fixing the button unit to the detachable frame; an operating part exposed at and secured to a bottom of the detachable frame; an accommodating part formed with an inner empty space, opened towards the first cavity from the inside of the second cavity of the detachable frame; and an elastic shaft protruding toward a top inner wall from the inside of the second cavity and coupled to the elastic body. The fixation protrusion of the lens unit may be inserted into and secured to a receptacle of the button unit.

In addition, the receptacle of the button unit may further include a step protruding toward a bottom to allow the fixation bump of the lens unit to be inserted and to have the second end seated thereon.

In addition, the detachable frame may further include a recessed area formed by partially recessing an outer surface where the third cavity is formed, and the eyewear may further include a finishing cover inserted and coupled to the recessed area of the detachable frame and covering the third cavity so as not to be exposed.

In addition, one end of the connecting member may be inserted and coupled to a coupling area located at the other end of the temple arm, and the other end of the connecting member may be inserted into and coupled to a fourth cavity formed as an empty space at one end of the detachable frame. The connecting member may pivot horizontally at a position coupled to the detachable frame, and pivot vertically at a position coupled to the temple arm.

In addition, the connecting member may include a detachable frame connection hole formed at the other end and penetrating vertically, and a temple arm connection hole formed at one end and penetrating horizontally. The detachable frame and the connecting member may be coupled by a connecting member connection piece, which is secured by vertically passing through a portion of the detachable frame in the fourth cavity of the detachable frame and then passing through the detachable frame connection hole. The connecting member and the eyeglass arm may be coupled by the temple arm connection piece, which is secured by horizontally passing through a portion of the temple arm and then passing through the temple arm connection hole. The connecting member may pivot horizontally around the connecting member connection piece and pivot vertically around the temple arm connection piece.

In addition, one end of the connecting member facing the temple arm may have a curved shape in a vertical cross-section, while the other end of the connecting member facing the detachable frame has a curved shape in a horizontal cross-section.

In addition, the connecting member may further include a plurality of angle adjustment parts, each formed between the detachable frame connection hole and the temple arm connection hole, positioned inside the temple arm, and protruding and spaced apart from each other. The angle adjustment parts may face an engagement part formed with alternating recessed and protruding areas in the temple arm. The engagement part may be formed in both inner side walls of the temple arm, facing the connecting member, and the angle adjustment parts may be formed on both surfaces of the connecting member to face the engagement part.

In addition, the eyewear may further include: a top frame formed over a top and sides of the lens of the lens unit. The top frame may include: a top support portion protruding laterally on the same line as the top of the lens; a top-frame first end located lower than the top support portion and extending in a first direction in which the top support portion protrudes; a top-frame second end bent inclinedly downward with respect to the first direction from the top-frame first end and extending again in the first direction; a top-frame fixation protrusion extending from the a top-frame second end and protrudes toward the top; and a top-frame bottom support portion protruding in the first direction from the bottom of the a top-frame fixation protrusion. The top-frame first end and the top-frame second end may be inserted into the first cavity of the detachable frame. The top-frame fixation protrusion may be inserted into the first cavity of the detachable frame and secured by engaging with a portion of the button unit.

In addition, the eyewear may further include: a bottom frame formed under the lens unit, positioned to face a user's nose; a nose pad frame protruding towards the user's face from the bottom frame; and a nose pad coupled to the nose pad frame. The nose pad frame may include a recessed hanging groove formed at a top, and a nose pad frame engagement part formed with alternating protruding and recessed areas at a bottom. The nose pad may include: a cavity formed as an empty space to accommodate the nose pad frame; a hanging rod connecting inner side walls of the cavity and formed to fit into the hanging groove; and a nose pad angle In addition, the nose pad frame may further include an abrasion prevention part formed by penetrating the nose pad frame at a location adjacent to the nose pad frame engagement part.

In addition, the abrasion prevention part may be formed in a manner in which a penetrating area extends in a direction in which the protruding and recessed areas of the nose pad frame engagement part are alternatively formed.

Specific details of other embodiments are included in the detailed description and the drawings.

Advantageous Effects

According to embodiments of the present disclosure, there are at least the following effects.

In the eyewear according to the present disclosure, the frame holding the lens is minimized, and the temple arm or connector connected to the lens is easily attachable or detachable, allowing a user to easily assemble a preferred temple arm in conjunction with the lens or replace the lens.

In addition, if there is a breakdown or damage to a part that connects the lens and the temple arm of the eyewear, it is possible to easily repair the corresponding part.

In addition, the eyewear allows users to easily adjust the angle of a temple arm or nose pad to his or her liking, enabling the user to personalize the eyewear according to his or her preferences.

In addition, the eyewear is firmly secured after adjusting the angle of a temple arm or nose pad, preventing unintended angle changes by the user, and it is possible to prevent abrasion of the frame where the temple arm and nose pad are connected, ensuring excellent durability.

The effects according to the present disclosure are not limited by the contents exemplified above, and more various effects are included in the present specification.

DESCRIPTION OF DRAWINGS

FIG. 1 is a perspective view of eyewear according to an embodiment of the present disclosure, as seen from one direction.

FIG. 2 is a perspective view of eyewear according to an embodiment of the present disclosure, as seen from another direction.

FIG. 3 is a detailed view showing a portion where a lens unit, a detachable frame, and a temple arm are connected in eyewear according to an embodiment of the present disclosure.

FIG. 4 is a diagram schematically showing a lens unit and a detachable frame being separated from eyewear according to an embodiment of the present disclosure.

FIG. 5 is an exploded perspective view of a portion where a lens unit, a detachable frame, and a temple arm are coupled in eyewear according to an embodiment of the present disclosure, as seen from one direction.

FIG. 6 is an exploded perspective view of a portion where a lens unit, a detachable frame, and a temple arm are coupled in eyewear according to an embodiment of the present disclosure, as seen from another direction.

FIG. 7 is a diagram schematically showing a lens unit and a detachable frame being separated in eyewear according to another embodiment of the present disclosure.

FIG. 8 is an exploded perspective view of a portion where a lens unit, a detachable frame, and a temple arm are coupled in eyewear according to another embodiment of the present disclosure, as seen from one direction.

FIG. 9 is an exploded perspective view of a portion where a lens unit, a detachable frame, and a temple arm are coupled in eyewear according to another embodiment of the present disclosure, as seen from another direction.

FIG. 10 is a diagram schematically showing how a detachable frame and a temple arm are coupled by a connecting member in eyewear according to an embodiment of the present disclosure.

FIG. 11 is an exploded view, as seen from one direction, of the coupling relationship of a detachable frame, a connecting member, and a temple arm in eyewear according to an embodiment of the present disclosure.

FIG. 12 is an exploded view, as seen from a different direction, of the coupling relationship of a detachable frame, a connecting member, and a temple arm in eyewear according to an embodiment of the present disclosure.

FIG. 13 is a perspective view schematically showing a nose pad frame coupled to a lens and a nose pad coupled thereto.

FIG. 14 is a perspective view showing a nose pad frame and a nose pad coupled thereto, as seen from another direction.

FIG. 15 is a cross-sectional view taken along line A-A' of a nose pad frame and a nose pad coupled thereto.

FIG. 16 is a cross-sectional view showing a nose pad coupled to a nose pad frame.

MODE FOR DISCLOSURE

The features and advantages of the present disclosure and the method to achieve them will become more apparent from the following detailed description in conjunction with the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present disclosure will only be defined by the appended claims. Like reference numerals refer to like elements throughout the specification. In the drawings, sizes and relative sizes of layers and regions may be exaggerated for clarity.

Spatially relative terms, such as "beneath," "below," "lower," "above," "upper" and the like, may be used herein for ease of description to describe one element or feature's relationship to another element(s) or feature(s) as illustrated in the figures.

In this specification, although the terms first, second, etc. may be used to describe various elements, it should be understood that these elements are not limited by these terms. These terms are only used to distinguish one element from another. Therefore, a first element could be termed as a second element without departing from the scope of exemplary embodiments of the present disclosure.

Hereinafter, embodiments of the present disclosure will be described with reference to the drawings.

FIG. 1 is a perspective view of eyewear according to an embodiment of the present disclosure, as seen from one direction; FIG. 2 is a perspective view of eyewear according to an embodiment of the present disclosure, as seen from another direction; and FIG. 3 is a detailed view showing a portion where a lens unit, a detachable frame, and a temple arm are connected in eyewear according to an embodiment of the present disclosure.

Referring to FIGS. 1 to 3, eyewear according to an embodiment of the present disclosure includes: a lens unit 100 including a lens; a detachable frame 200 detachably coupled to the lens unit 100 at left and right ends relative to

[Detailed Description of Main Elements]

| | |
|---|---|
| 50: elastic body | 100: lens |
| 110: first end of lens | 111: top-frame first end of lens |
| 120: second end of lens | 121: top-frame second end of |
| 131: top support portion | 140: fixation protrusion |
| 141: top-frame fixation | 151: top-frame bottom support portion |
| 200: detachable frame | 210: first cavity |
| 220: cavity connector | 230: second cavity |
| 260: third cavity | 270: recessed area |
| 280: lower hole | 290: upper hole |
| 300: button unit | 310: anchor heel |
| 320: body | 330: operating part |
| 340: accommodating part | 350: elastic shaft |
| 360: stepping threshold | 400: adhesive layer |
| 500: connecting member | 510: temple arm connection hole |
| 520: detachable frame connection | 530: angle adjustment parts |
| 600: temple arm | 610: exposed area |
| 620: coupling area | 630: engagement part |
| 700: bottom frame | 800: nose pad frame |
| 810: recessed hanging groove | 820: stepped portion |
| 830: engagement part | 840: abrasion prevention part |
| 900: nose pad | 910: hanging rod |
| 920: nose pad cavity | 930: nose pad angle adjustment part |
| 1000: connecting member connection piece | 1010: temple arm connection piece |
| 1020: temple arm connection piece finishing part | | a user; a temple arm 600 coupled to one end of the detachable frame 200 for fitting over the user's ears; and a connecting member 500 positioned between the detachable frame 200 and the temple arm 600 to connect the detachable frame 200 and the temple arm 600.

The lens unit 100 includes the lens. When the eyewear is worn on the user, the lens unit 100 is placed in a position corresponding to the user's eyeball. The lens unit 100 may be formed of a transparent material so that the user can see an external object. In addition, the lens of the lens unit 100 may be formed to protect the user's eyes from strong light by including a colorant or attaching a coloring film, etc., but the lens is not limited thereto. In addition, the lens of the lens unit 100 may adapt various additional features such as an ultraviolet absorbers, anti-fog treatments, and the like. The lens may be formed of glass or a resin material such as polycarbonate (PC), or may be formed of various materials commonly used in the field to which the present disclosure pertains. In addition, the lens may be a lens corresponding to the left eye and the right eye, or a lens formed as an integrated lens as shown in the drawing. However, the lens is not particularly limited to either lens.

The detachable frame 200 may be formed of various materials such as synthetic resin and metal. The detachable frame 200 may be coupled to or detached from the lens unit 100, and may be coupled to both left and right ends of the lens unit 100 in a detachable form. That is, the detachable frame 200 may be coupled to or separated from the both end of the lens unit 100 where the temple arms 600 are formed. Since the detachable frame 200 of the present disclosure is separable from the lens unit 100, if a user wishes to replace the lens with a different type, the user may easily replace the lens by detaching the lens unit 100 from the detachable frame 200 and then coupling a lens unit with a different lens, enabling convenient replacement of a lens in the eyewear. Meanwhile, the detachable frame 200 may be coupled to both ends of the lens unit 100 and composed of a plurality of pieces, for example, two pieces.

The temple arm 600 is composed of multiple pieces that are respectively coupled to the detachable frames 200 coupled to both ends of the lens unit 100. The temple arm 600 may be coupled to both ends of the lens unit 100 and fit over the user's ears, thereby allowing the eyewear to be fixed on the user's face. The temple arm 600 may be formed of various materials, such as plastic resin or metal, and may extend in the user's facial direction to ensure a comfortable fit over the user's ears. In addition, an anti-slip portion formed of rubber or silicone may be coupled to the temple arm 600 to prevent the eyewear from slipping away from the user.

The connecting member 500 may connect the detachable frame 200 and the temple arm 600. As described above, the detachable frames 200 and the temple arm 600 are arranged on both sides of the user's face (so as to correspond to both ears), and the connecting member 500 may also be provided in plural to be arranged on both sides of the user's face to correspond to the detachable frames 200 and the temple arm 600. The connecting member 500, as described later, is configured to pivot horizontally (in a horizontal direction from the user's perspective) relative to the detachable frames 200 so as to allow the temple arm 600 to move in the left-right direction, while pivoting vertically (in a vertical direction from the user's perspective) relative to the temple arm 600 so as to allow angle adjustment of the temple arm 600 between the temple arm 600 and the lens unit 100, enabling a user to wear the eyewear at the desired angle. In conventional eyewear, temple arms are designed to simply fold in the left-right direction, but in the present disclosure, due to the structure of the connecting members 500, the temple arms 600 are allowed to be folded horizontally and, at the same time, vertically adjusted in angle, allowing a user to adjust the angle of the temple arm 600 to his or her convenience.

Meanwhile, FIG. 4 is a diagram schematically showing a lens unit and a detachable frame being separated from eyewear according to an embodiment of the present disclosure; FIG. 5 is an exploded perspective view of a portion where a lens unit, a detachable frame, and a temple arm are coupled in eyewear according to an embodiment of the present disclosure, as seen from one direction; and FIG. 6 is an exploded perspective view of a portion where a lens unit, a detachable frame, and a temple arm are coupled in eyewear according to an embodiment of the present disclosure, as seen from another direction.

Referring to FIGS. 4 to 6, the eyewear of the present disclosure further includes a button unit 300 that allows the lens unit 100 to be coupled or separated. The button unit 300 may be inserted inside the detachable frame 200 and may move up and down to engage a portion of the lens unit 100 so as to couple or separate the detachable frame 200 and the lens unit 100. That is, when the button unit 300 is pressed to move upward inside the detachable frame 200, the portion engaging the lens unit 100 opens, thereby creating a space for the lens unit 100 to move, allowing the lens unit 100 to be removed. Furthermore, when the lens unit 100 is inserted into the inside of the detachable frame 200, a portion of the lens unit 100 is inserted into a portion of the inside of the button unit 300. In this case, when the button unit 300 is pressed downward (automatically by an elastic body 50 which will be described later), a portion of the lens unit 100 may be engaged with the button unit 300 inside the detachable frame 200, maintaining the coupled state of the detachable frame 200 and the lens unit 100.

More specifically, the detachable frame 200 includes: a first cavity 210 formed as an empty space at a location facing one end of the lens unit 100, allowing a portion of the lens unit 100 to be inserted into the side surface of the detachable frame 200; and a second cavity 230 formed as an empty space that opens from bottom to top, enabling the button unit 300 to be inserted and moves up and down. The first cavity 210 and the second cavity 230 may be connected to each other inside the detachable frame 200. That is, the first cavity 210 and the second cavity 230 may be empty spaces that are integrally formed and connected by a cavity connector 220. The space where the cavity connector 220 is formed may widen as the button unit 300 moves upward, allowing a portion of the lens unit 100 to enter the inside of the button unit 300. Conversely, as the button unit 300 moves downward, the space where the cavity connector 220 may narrow, causing a portion of the lens unit 100 to be caught and secured inside the button unit 300 and the detachable frame 200.

Meanwhile, the lens of the lens unit 100 may include the following, each located at left and right sides: a first end 110 bent inclinedly downward with respect to a first direction, in which the top of the lens is directed, and extending again in the first direction; a second end 120 bent inclinedly from the first end 110 downward with respect to the first direction and extending again in the first direction; and a fixation protrusion 140 extending from the second end 120 and protruding toward the top. In addition, the first end 110 and the second end 120 are inserted into the first cavity 210 of the detachable frame 200. Thus, when the lens unit 100 is coupled and fixed, the first end 110 and the second end 120 may be supported on an inner wall of the first cavity 210 of the detachable frame 200 so that the lens unit 100 is firmly fixed not to move. In addition, the fixation protrusion 140 may be inserted into the first cavity 210 of the detachable frame 200 and secured by engaging with a portion of the button unit 300.

The first end 110 of the lens may be supported on the inner wall of the detachable frame 200, the fixation protrusion 140 may be inserted into the inside of the button unit 300, and the second end 120 at its boundary with the fixation protrusion 140 may eventually secure the lens unit 100 to the detachable frame 200 and the button unit 300 through a downward force exerted by a part of the button unit 300. That is, the first end 110 of the lens is designed to minimize the movement of the lens unit 100 when it is fixed inside the detachable frame 200, ensuring a stable coupled state, and the second end 120 and the fixation protrusion 140 function to be secured or separated.

For more stable coupling of the lens unit 100, the detachable frame 200, and the button unit 300, the first end 110 of the lens unit 100 may be formed to be longer than the second end 120, so that the portion of the first end 110 supported on the inner wall of the detachable frame 200 is formed to be long. The fixation bump 140 formed by the lens of the lens unit 100 protrudes toward the top and then extends again inclinedly downward from a lower side of the fixation protrusion 140 in the opposite direction to the first direction. This configuration clearly distinguishes the shape of the fixation bump 140, ensuring a more stable fixation of the lens unit 100 to the inner wall of the detachable frame 200 and the button unit 300.

Meanwhile, the detachable frame 200 further includes: a third cavity 260 externally exposed on the same horizontal line as the first cavity, but in a lateral direction perpendicular to a direction in which the first cavity 210 is formed. An elastic body 50 may be further included, which is positioned inside the second cavity 230 of the detachable frame 200, between the inner wall of the detachable frame 200 and the button unit 300, allowing the button unit 300 to move up and down. In addition, the button unit 300 may include: a body 320 inserted into the detachable frame 200; an anchor heel 310 protruding from the body 320 toward the third cavity of the detachable frame 200, fixing the button unit 300 to the detachable frame 200; an operating part 330 exposed at and secured to the bottom of the detachable frame 200; an accommodating part 340 formed with an inner empty space, opened towards the first cavity 210 from the inside of the second cavity 230 of the detachable frame 200; and an elastic shaft 350 protruding toward the top inner wall from the inside of the second cavity 230 and coupled to the elastic body 50.

The elastic body 50 allows the button unit 300 to move up and down in the second cavity 230, and may be formed of a material such as a spring, for example. Accordingly, when no force is applied, a downward force is exerted on the button unit 300, and when a user applies a force upwards through the operating part 330 of the button unit 300, the elastic body 50 is compressed, enabling the button unit 300 to move upwards. In addition, the elastic body 50 may be fixed to the button unit 300 with one side coupled to the elastic shaft 350 of the button unit 300 so as to move up and down only within the second cavity 230 of the detachable frame 200, whereas the other side is supported on the inner wall of the second cavity 230.

Meanwhile, the operation part 330 of the button unit 300 is exposed at the bottom of the detachable frame 200, and the exposed portion of the operation part 330 protrudes in a lateral direction (i.e., a horizontal direction) so that the entire button unit 300 cannot be inserted into the second cavity 230. In addition, the anchoring heel 310 of the button unit 300 may be inserted into and coupled to the externally exposed (open) third cavity 260 in the lateral direction of the detachable frame 200, so that that the button unit 300 does not unintentionally detach due to downward pressure on the elastic body 50. That is, as shown in FIGS. 7 and 8, when the button unit 300 is inserted through the second cavity 230 of the detachable frame 200, the anchoring heel 310 may be inserted into and fixed in the third cavity 260 and secured, allowing only a certain displacement in the vertical direction. As a result, the button unit 300 is allowed to move within a specific range, enabling the coupling or separation of the lens unit 100 and preventing complete separation from the detachable frame 200.

Meanwhile, the fixation protrusion 140 of the lens unit 100 may be inserted into and fixed to a receptacle 340 of the button unit 300. As described above, a portion of the lens unit 100 is initially inserted into the first cavity 210 of the detachable frame 200, and reach the button unit 300, positioned inside the second cavity 230, through a cavity connector 220 connecting the first cavity 210 and the second cavity 230, so that the fixation protrusion 140 of the lens unit 100 can be inserted into the receptacle 340 formed as an empty space inside the button unit 300. At this point, when force is applied to the button unit 300, the elastic body 50 may be compressed and the button unit 300 may move upward, allowing the fixation protrusion 140 of the lens unit 100 to be inserted into the button unit 300. In addition, when force is released from the button unit 300, the downward force applied by the elastic body 50 may cause the button unit 300 to move downward again, thereby engaging the end of the second end 120, which is connected to the fixation protrusion 140 of the lens unit 100, with the receptacle 340 of the button unit 300 to secure the lens unit 100. That is, the receptacle 340 of the button unit 300 may further include a step protruding toward the bottom to allow the fixation bump 140 of the lens unit 100 to be inserted and to have the second end 120 seated thereon. The second end 120 may be supported by the protruding step, thereby allowing the lens unit 100 to be coupled and fixed to the button unit 300 and the detachable frame 200.

Meanwhile, the detachable frame 200 may further include: a recessed area 270 formed by partially recessing on an outer surface where the third cavity 260 is formed. A finishing cover 400 may be further included, which is inserted into and coupled to the recessed area 270 of the detachable frame 200, covering the third cavity 260 not to be exposed externally. If there is no third cavity 260, it may be difficult to separate the button unit 300 and the anchoring heel 310 when the button unit 300 malfunctions or is partially damaged, which could lead to the disposal of both the detachable frame 200 and the button unit 300 or make it challenging to repair any issues. Therefore, by exposing the third cavity 260 externally, it is possible to push the anchoring heel 310 to detach the button unit 300 by applying external force and to easily replace or repair only the button unit 300 when the button unit 300 malfunctions. This allows for very easy repair or replacement. If the third cavity 260 is exposed in this manner, it may affect the product's design or aesthetics. Therefore, the finishing cover 400, which conceals the third cavity 260 from external exposure, is attached to the recessed area 270 formed by partially recessing the outer surface where the cavity 260 is formed, so that the cavity 260 remains concealed when the replacement or repair of the button unit 300 is required.

Meanwhile, FIG. 7 is a diagram schematically showing a lens unit and a detachable frame being separated in eyewear according to another embodiment of the present disclosure; FIG. 8 is an exploded perspective view of a portion where a lens unit, a detachable frame, and a temple arm are coupled in eyewear according to another embodiment of the present disclosure, as seen from one direction; FIG. 9 is an exploded perspective view of a portion where a lens unit, a detachable frame, and a temple arm are coupled in eyewear according to another embodiment of the present disclosure, as seen from another direction.

Referring to FIGS. 7 to 9, eyewear according to another embodiment of the present disclosure further includes a top frame formed over the top and sides of the lens of the lens unit 100. The top frame may include: a top support portion 131 protruding laterally on the same line as the top of the lens; a top-frame first end 111 located lower than the top support portion 131 and extending in a first direction in which the top support portion 131 protrudes; a top-frame second end 121 bent inclinedly downward with respect to the first direction from the top-frame first end 111 and extending again in the first direction; a top-frame fixation protrusion 141 extending from the top-frame second end 121 and protruding toward the top; and a top-frame bottom support portion 151 protruding in the first direction from the bottom of the top-frame fixation protrusion 141.

In the coupling between the lens unit and the detachable frame 200, the top support portion 131 and the top-frame bottom support portion 151 prevent the lens unit from moving up and down, ensuring a stable and secure coupling. In addition, the top-frame first end 111 and the top-frame second end 121 are inserted into the first cavity 210 of the detachable frame 200, and the top-frame fixation protrusion 141 is inserted into the first cavity 210 of the detachable frame 200 and secured by engaging with a portion of the button unit 300. Thus, the first end 111, the second end 121, and the top-frame fixation protrusion 141 serve the same functions as those of the first end 110, the second end 120, and the fixation protrusion 140 of the lens of the lens unit 100, as described above.

That is, in FIGS. 1 to 6, the shape of the lens of the lens unit 100 is designed to be coupled with the detachable frame 200 and the button unit 300, and in this embodiment, the shape of both ends of the top frame coupled to the top of the lens are formed in a manner similar to the shape of the lens in FIGS. 1 to 6, thereby serving the same function. As such, in the eyewear of the present disclosure, the shape of a lens itself may be designed to form a first end, a second end, and a fixation protrusion, which are allowed to be coupled to or separated from different components. Alternatively, a top frame coupled to the lens may be designed to form a top-frame first end, a top-frame second end, and a top-frame fixation protrusion, which are allowed to be coupled to or separated from different components in the same way as the lens. However, aspects of the present disclosure are not limited thereto.

FIG. 10 is a diagram schematically showing how a detachable frame and a temple arm are coupled by a connecting member in eyewear according to an embodiment of the present disclosure; FIG. 11 is an exploded view, as seen from one direction, of the coupling relationship of a detachable frame, a connecting member, and a temple arm in eyewear according to an embodiment of the present invention; and FIG. 12 is an exploded view, as seen from a different direction, of the coupling relationship of a detachable frame, a connecting member, and a temple arm in eyewear according to an embodiment of the present invention.

Referring to FIGS. 10 to 12, in the eyewear of the present disclosure, one end of the connecting member 500 may be inserted and coupled to a coupling area 620 located at the other end of the temple arm 600, and the other end of the connecting member 500 may be inserted into and coupled to a fourth cavity 250 formed as an empty space at one end of the detachable frame 200, so that the detachable frame 200 and the temple arm 600 can be coupled together with respect to the connecting member 500 in the eyewear. In addition, as already explained above, the connecting member 500 may rotate in the left-right direction (horizontal direction) at a position where the connecting member 500 is coupled to the detachable frame 200 to fold or unfold the temple arms 600, and the connecting member 500 may rotate in the up and down direction (vertical direction) at a position where the connecting member 500 is coupled to the temple arms 600 to adjust the relative angle between the temple arm 600 and the lens unit 100.

To this end, the connecting member 500 may include a detachable frame connection hole 520, formed at the other end and penetrating vertically, and a temple arm connection hole 510 formed at one end and penetrating horizontally. The detachable frame 200 and the connecting member 500 may be coupled by a connecting member connection piece 1000, which is secured by vertically passing through a portion of the detachable frame 200 in the fourth cavity 250 of the detachable frame 200 and then passing through the detachable frame connection hole 520. The connecting member 500 and the temple arm 600 may be coupled by the temple arm connection piece 1010, which is secured by horizontally passing through a portion of the temple arm 600 and then passing through the temple arm connection hole 510. The connecting member 500 may pivot horizontally around the connecting member connection piece 1000 and pivoting vertically around the temple arm connection piece 1010.

In addition, one end of the connecting member 500 facing the temple arm 600 may have a curved shape in a vertical cross-section, and the other end facing the detachable frame 200 may have a curved shape in a horizontal cross-section. Accordingly, the connecting member 500 and the detachable frame 200 may pivot horizontally around the connecting member connection piece 1000, which is inserted and coupled through the detachable frame connection hole 520, and the connecting member 500 and the temple arms 600 may pivot vertically around the temple arm connection piece 1010, which is inserted and coupled through the temple arm connection hole 510.

The detachable frame connection hole 520 is formed by penetrating in the vertical direction, and the portion of the connecting member 500 where the detachable frame connection hole 520 is formed has a curved shape in a horizontal cross-section. This allows movement in the horizontal direction with respect to the connecting member connection piece 1000, which penetrates the detachable frame connection hole 520. The temple arm connection hole 510 is formed by penetrating in the horizontal direction, and the portion of the connecting member 500 where the temple arm connection hole 510 is formed has a curved shape in a vertical cross-section. This allows movement in the vertical direction with respect to the temple arm connection piece 1010, which penetrates the temple arm connection hole 510.

In other words, to form an axis relative to the detachable frame 200 while passing through the detachable frame connection hole 520, the connecting member connection piece 1000 may pass through a lower hole 280 at a portion where the fourth cavity 250 of the detachable frame 200 is formed. Then, the connecting member connection piece 1000 may pass through the detachable frame connection hole 520 again and be secured to an upper hole 290, or may pass through the upper hole and be secured to the lower hole 280. In addition, the temple arm connection piece 1010 may pass through an exposed area 610 that penetrates the temple arm 600 in the left-right direction. At the center, the temple arm connection piece 1010 may pass through the temple arm connection hole 510 and be secured to the temple arm 600 by a temple arm connection piece finishing part 1020. Accordingly, with the temple arm connection piece 1010 acting as an axis, vertical angle adjustment of the temple arm is facilitated.

Meanwhile, the connecting member 500 may further include a plurality of angle adjustment parts 530, each formed between the detachable frame connection hole 520 and the temple arm connection hole 510, positioned inside the temple arm 600, and protruding and spaced apart from each other. The angle adjustment parts 530 may face an engagement part 630 formed with alternating recessed and protruding areas inside the temple arm 600. The engagement part 630 may be formed in both inner side walls of the temple arm 600, facing the connecting member 500, and the angle adjustment parts 530 may be formed on both sides of the connecting member 500 to face the engagement part 630.

Accordingly, a protruding portion of each angle adjustment part 530 of the connecting member 500 may be inserted into a recessed area of the engagement part 630 and remain fixed in position. When an external force is applied, the position of the angle adjustment part 530 may change and be fixed in a different recessed area at a different location in the engagement portion 630. In this manner, it is possible to adjust and fix the angle between the temple arm 600 and the lens unit 100 in the vertical direction. In addition, with the plurality of angle adjustment parts 530 positioned to face the alternating recessed and protruding areas of the engagement part 630, the temple arm 600 may be securely held in place once it has been moved in the vertical direction, provided there is no strong external force applied. When it is necessary to adjust the angle of the temple arm 600, applying a force exceeding a predetermined threshold in the vertical direction on the temple arm 600 may cause the angle adjustment parts 530 to move beyond the protruding portions of the engagement part 630 and be secured in the next position. As a result, it is possible to adjust the angle of the temples of the eyewear and maintain the angle when no force exceeding the predetermined threshold is applied.

FIG. 13 is a perspective view schematically showing a nose pad frame coupled to a lens and a nose pad coupled thereto, and FIG. 14 is a perspective view showing a nose pad frame and a nose pad coupled thereto, as seen from another direction. In addition, FIG. 15 is a cross-sectional view taken along line A-A' of a nose pad frame and a nose pad coupled thereto, and FIG. 16 is a cross-sectional view showing a nose pad coupled to a nose pad frame.

Referring to FIGS. 13 to 16, eyewear according to an embodiment of the present disclosure may further include a bottom frame 700 formed under the lens unit 100, positioned to face a user's nose, a nose pad frame 800 protruding towards the user's face from the bottom frame 700, and a nose pad 900 coupled to the nose pad frame 800. The nose pad frame 800 may include a recessed hanging groove 810 formed at the top and a nose pad frame engagement part 830 formed with alternating protruding and recessed areas at the bottom. The nose pad 900 may include a cavity 920 formed as an empty space to accommodate the nose pad frame 800, a hanging rod 910 connecting the inner side walls of the cavity 920 and designed to fit into the hanging groove 810, and a nose pad angle adjustment part 930 facing the nose pad frame engagement part 830 and formed with alternating protruding and recessed areas.

The nose pad 900 may be formed of a soft material, such as rubber or silicone, so that the user does not feel uncomfortable due to the soft material when the eyewear is placed on the user's nose.

Specifically, the nose pad frame 800 may include the recessed hanging groove 810 formed at the upper end, and the nose pad frame engagement part 830 formed with alternating protruding and recessed areas at the lower end. Also, the nose pad frame 800 may further include a stepped portion 820 formed adjacent to the hanging groove 810. In addition, the nose pad 900 has a nose pad cavity 920 formed as an empty space to accommodate and couple the nose pad frame 800, connects both side walls within the nose pad cavity 920, and has a hanging groove 810.) and a nose pad locking bar 910 formed to hang on the nose pad frame engagement part 830 and a nose pad angle adjustment part 930 formed by repeatedly forming protruding areas and recessed areas.

The nose pad hanging rod 910 is formed within the nose pad cavity 920 of the nose pad 900. When the nose pad hanging rod 910 fits into the hanging groove 810 of the nose pad frame 800, the top of the nose pad 900 may be secured and the nose pad 900 may be prevented from detaching from the nose pad frame 800 due to the stepped portion 820. In addition, a vertical cross-section of the hanging rod 910 is formed in a circular shape, and once inserted into the hanging groove 810, the hanging rod 910 acts as an axis, enabling vertical movement of the nose pad 900. In addition, as the nose pad frame engagement part 830, which is formed with alternating protruding and recessed areas, and the nose pad angle adjustment part 930, which is formed with alternating protruding and recessed areas, face each other, it is possible to adjust the angle of the nose pad 900 in the up-down direction while securing the position of the nose pad 900. In other words, the nose pad 900 is allowed to move in the up-down direction with the nose pad hanging rod 910 fitting into the hanging groove 810 as an axis (that is, in order to allow forward and backward movement of the nose pad while the nose pad moves in the up-down direction), and when the nose pad 900 changes in position, the nose pad 900 may maintain the position by the nose pad angle adjustment part 930 and the nose pad frame engagement part 830 facing each other.

Meanwhile, the nose pad frame 800 may further include an abrasion prevention part 840 formed by penetrating the nose pad frame 800 at a location adjacent to the nose pad frame engagement part 830. When continuously adjusting the position of the nose pad 900, the contact and friction between the nose pad angle adjustment part 930 and the nose pad frame engagement part 830, which is formed of a relatively hard material, may lead to abrasion of the nose pad frame engagement part 830. For this reason, the abrasion prevention part 840 formed by penetrating the nose pad frame 800 at a location adjacent to the nose pad frame engagement part 830 may be formed to counteract and cushion the forces acting on the nose pad frame engagement part 830, thereby minimizing abrasion of the nose pad frame engagement part 830. Therefore, even if the position and angle of the nose pad 900 are continuously changed, abrasion of the nose pad frame engagement part 830 may be prevented and durability may improve.

In addition, the abrasion prevention part 840 may be formed in a manner in which a penetrating area extends in a direction in which the protruding and recessed areas of the nose pad frame engagement part 830 are alternatively formed. Accordingly, it is possible to effectively prevent abrasion of the nose pad frame engagement part 830.

While the present disclosure has been described with reference to exemplary embodiments thereof, it will be understood by those of ordinary skill in the art that various changes in form and detail may be made therein without departing from the spirit and scope of the present disclosure. Therefore, the above-described embodiments should be considered in a descriptive sense only, and not for purposes of limitation.

The invention claimed is:

1. Eyewear comprising:
a lens unit comprising a lens;
a detachable frame detachably coupled to the lens unit at both left and right ends of the lens unit with respect to a user;
a temple arm coupled to one end of the detachable frame and fitting over the user's ears;
a connecting member disposed between the detachable frame and the eyeglass temple to connect the detachable frame and the eyeglass temple; and
a button unit inserted inside the detachable frame and moving up and down to engage and separate a portion of the lens unit so as to couple or separate the detachable frame and the lens unit,
wherein the detachable frame comprises:
a first cavity formed as an empty space at a location facing one end of the lens unit, allowing a portion of the lens unit to be inserted into a side surface of the detachable frame, and
a second cavity formed as an empty space that opens from bottom to top, enabling the button unit to be inserted and move up and down, and
wherein the first cavity and the second cavity are connected to each other inside the detachable frame.

2. The eyewear of claim 1,
wherein the lens of the lens unit comprises the following, each located at both left and right ends:
a first end bent inclinedly downward with respect to a first direction, in which a top of the lens is directed, and extending again in the first direction;
a second end bent inclinedly from the first end downward with respect to the first direction and extending again in the first direction; and
a fixation protrusion extending from the second end and protruding toward the top,
wherein the first and second ends are inserted into the first cavity of the detachable frame, and
wherein the fixation protrusion is inserted into the first cavity of the detachable frame and is secured by engaging with a portion of the button unit.

3. The eyewear of claim 2,
wherein the first end of the lens unit is longer than the second end,
wherein the fixation protrusion protrudes toward the top and then recesses again inclinedly toward the bottom, and
wherein the lens unit extends again inclinedly downward from a lower side of the fixation protrusion in the opposite direction to the first direction.

4. The eyewear of claim 2,
wherein the detachable frame further comprises a third cavity externally exposed on a same horizontal line as the first cavity, but in a direction perpendicular to the direction in which the first cavity is formed,
wherein the eyewear further comprises an elastic body disposed within the second cavity of the detachable frame, between an inner wall of the detachable frame and the button unit, to allow the button unit to move up and down,
wherein the button unit comprises:
a body inserted into the detachable frame;
an anchor heel protruding from the body toward the third cavity of the detachable frame, fixing the button unit to the detachable frame;
an operating part exposed at and secured to a bottom of the detachable frame;
an accommodating part formed with an inner empty space, opened towards the first cavity from the inside of the second cavity of the detachable frame; and
an elastic shaft protruding toward a top inner wall from the inside of the second cavity and coupled to the elastic body, and
wherein the fixation protrusion of the lens unit is inserted into and secured to a receptacle of the button unit.

5. The eyewear of claim 4, wherein the receptacle of the button unit further comprises a step protruding toward a bottom to allow the fixation bump of the lens unit to be inserted and to have the second end seated thereon.

6. The eyewear of claim 4,
wherein the detachable frame further comprises a recessed area formed by partially recessing an outer surface where the third cavity is formed, and
wherein the eyewear further comprises a finishing cover inserted and coupled to the recessed area of the detachable frame and covering the third cavity so as not to be exposed.

7. The eyewear of claim 1, wherein one end of the connecting member is inserted and coupled to a coupling area located at the other end of the temple arm,
wherein the other end of the connecting member is inserted into and coupled to a fourth cavity formed as an empty space at one end of the detachable frame,
wherein the connecting member pivots horizontally at a position coupled to the detachable frame, and pivots vertically at a position coupled to the temple arm.

8. The eyewear of claim 1, further comprising:
a top frame formed over a top and sides of the lens of the lens unit,
wherein the top frame comprises:
a top support portion protruding laterally on the same line as the top of the lens;
a top-frame first end located lower than the top support portion and extending in a first direction in which the top support portion protrudes;
a top-frame second end bent inclinedly downward with respect to the first direction from the top-frame first end and extending again in the first direction;
a top-frame fixation protrusion extending from the a top-frame second end and protrudes toward the top; and
a top-frame bottom support portion protruding in the first direction from the bottom of the a top-frame fixation protrusion,
wherein the top-frame first end and the top-frame second end are inserted into the first cavity of the detachable frame, and wherein the top-frame fixation protrusion is inserted into the first cavity of the detachable frame and secured by engaging with a portion of the button unit.

9. An eyewear comprising:

a lens unit comprising a lens;

a detachable frame detachably coupled to the lens unit at both left and right ends of the lens unit with respect to a user;

a temple arm coupled to one end of the detachable frame and fitting over the user's ears; and a connecting member disposed between the detachable frame and the eyeglass temple to connect the detachable frame and the eyeglass temple, wherein one end of the connecting member is inserted and coupled to a coupling area located at the other end of the temple arm, wherein the other end of the connecting member is inserted into and coupled to a fourth cavity formed as an empty space at one end of the detachable frame, wherein the connecting member pivots horizontally at a position coupled to the detachable frame, and pivots vertically at a position coupled to the temple arm, wherein the connecting member comprises a detachable frame connection hole formed at the other end and penetrating vertically, and a temple arm connection hole formed at one end and penetrating horizontally, wherein the detachable frame and the connecting member are coupled by a connecting member connection piece, which is secured by vertically passing through a portion of the detachable frame in the fourth cavity of the detachable frame and then passing through the detachable frame connection hole, wherein the connecting member and the eyeglass arm are coupled by the temple arm connection piece, which is secured by horizontally passing through a portion of the temple arm and then passing through the temple arm connection hole, wherein the connecting member pivots horizontally around the connecting member connection piece and pivots vertically around the temple arm connection piece.

10. The eyewear of claim 9, wherein one end of the connecting member facing the temple arm has a curved shape in a vertical cross-section, while the other end of the connecting member facing the detachable frame has a curved shape in a horizontal cross-section.

11. The eyewear of claim 9, wherein the connecting member further comprises a plurality of angle adjustment parts, each formed between the detachable frame connection hole and the temple arm connection hole, positioned inside the temple arm, and protruding and spaced apart from each other, wherein the angle adjustment parts face an engagement part formed with alternating recessed and protruding areas in the temple arm, and wherein the engagement part is formed in both inner side walls of the temple arm, facing the connecting member, and the angle adjustment parts are formed on both surfaces of the connecting member to face the engagement part.

12. An eyewear comprising:

a lens unit comprising a lens;

a detachable frame detachably coupled to the lens unit at both left and right ends of the lens unit with respect to a user;

a temple arm coupled to one end of the detachable frame and fitting over the user's ears;

a connecting member disposed between the detachable frame and the eyeglass temple to connect the detachable frame and the eyeglass temple;

a bottom frame formed under the lens unit, positioned to face a user's nose;

a nose pad frame protruding towards the user's face from the bottom frame; and a nose pad coupled to the nose pad frame, wherein the nose pad frame comprises a recessed hanging groove formed at a top, and a nose pad frame engagement part formed with alternating protruding and recessed areas at a bottom, wherein the nose pad comprises:

a cavity formed as an empty space to accommodate the nose pad frame;

a hanging rod connecting inner side walls of the cavity and formed to fit into the hanging groove; and a nose pad angle adjustment part facing the nose pad frame engagement part and formed with alternating protruding and recessed areas.

13. The eyewear of claim 12, wherein the nose pad frame further comprises an abrasion prevention part formed by penetrating the nose pad frame at a location adjacent to the nose pad frame engagement part.

14. The eyewear of claim 13, wherein the abrasion prevention part is formed in a manner in which a penetrating area extends in a direction in which the protruding and recessed areas of the nose pad frame engagement part are alternatively formed.

\* \* \* \* \*